Dec. 15, 1953
E. J. BECKER ET AL
2,662,839
METHOD OF DESULFURIZING CARBON-COATED METALS
Filed April 11, 1950
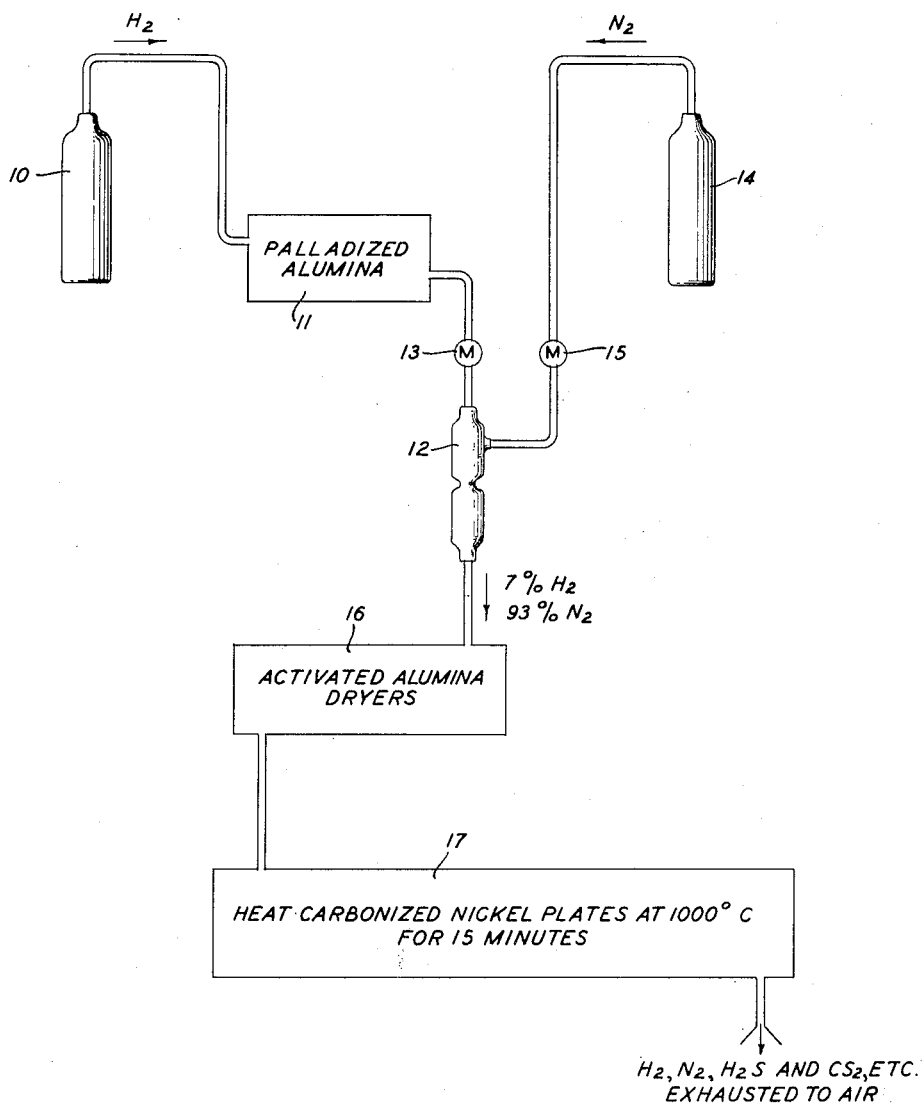
INVENTORS: E. J BECKER
F. J. BIONDI
BY
ATTORNEY Patented Dec. 15, 1953

2,662,839

UNITED STATES PATENT OFFICE 2,662,839

METHOD OF DESULFURIZING CARBON-COATED METALS

Edward J. Becker, South Plainfield, and Frank J. Biondi, Livingston, N. J., assignors to Bell Telephone Laboratories, Incorporated, New York, N. Y., a corporation of New York Application April 11, 1950, Serial No. 155,188

6 Claims. (Cl. 148—13.1)

This invention relates to the desulphurization of metals and, more particularly, to removing sulphur compounds from carbon-coated nickel.

In electron discharge devices, the electron emitters are often coated with oxides that are very sensitive to poisonous gases or compounds evolved in the device during its operation. Particularly, these oxides are deleteriously attacked by any sulphur that may evolve from sulphur containing materials within the device. The sulphur reacts with certain components of the thermionic coating and will greatly reduce the efficiency of the coating as an emitter or may completely destroy it.

Sulphur may enter the device by being in the metal elements, principally the anode, or by being in any coating that may be applied to the elements. This is particularly true of nickel electrodes, wherein sulphur, metal sulphide, and other sulphur compounds may be found. It is to be appreciated that it is desirable for electron discharge devices that all the sulphur and sulphur compounds present in these elements be removed.

Sulphur may also enter the device by being entrapped in the anode coating. In electron discharge devices, back emission from the anode or plate is often reduced by the deposition thereon of a black carbonizing layer or film which increases the dissipation of heat from the anode or plate. The anode may be carbonized by first oxidizing it and then passing the oxidized metal through a hydrocarbon atmosphere. The hot metal cracks the hydrocarbon gases to form hydrogen, carbon, and lower molecular weight hydrocarbons. The hydrogen in turn reduces the metal surface oxide to form a clean surface which readily combines with the freshly generated carbon to form a tenaciously held black carbon layer. This layer, however, is very finely divided and has a large area so that it readily absorbs gases from the atmosphere, amongst which are particularly hydrogen sulphide, sulphur dioxide, carbon disulphide, and others. Further, there are apparently some sulphur compounds present as impurities in the hydrocarbon gas and thus in the deposited carbon itself.

It is, therefore, necessary to remove the sulphur from both the metal electrodes and particularly the carbonized layer. Attempts to remove the sulphur have in the past been hindered by the carbon necessarily present. The sulphur needs to be removed without disturbing the carbon coating, either by removal of the carbon, which is most likely to occur, or by deposition of carbon. The removal of the carbon is obviously undesirable, as it would impair the heat dissipation from the anode due to the carbon layer. The deposition of carbon is, however, just as undesirable, as the carbon that may be deposited during any desulphurization process is only loosely deposited, not being securely held to the clean surface, as is the carbonized layer deposited by the method outlined above. This loose carbon may easily be removed from the anode during the life of the device. It then becomes a dust within the device and will deleteriously affect its operation.

The sulphur may be expeditiously removed by placing the electrode in a hydrogen atmosphere, the hydrogen removing the sulphur as hydrogen sulphide by reducing the metallic sulphides. In addition, adsorbed or absorbed sulphur compound gases are removed by virtue of the effect of heat and the flowing hydrogen. However, when carbon is present, the hydrogen will also combine with the carbon under normal conditions to form methane. Both reactions are reversible. The fact that under equilibrium conditions, methane, hydrogen, and carbon may coexist has been employed in one method of desulphurization which is described in Patent No. 2,314,816, issued March 23, 1943, to J. R. C. Brown, Jr. and L. A. Wooten. In their method, carbonized nickel may be desulphurized by heating it at 1050° C. for thirty minutes in a flow of a pure and dry mixture of 5 per cent methane and 95 per cent hydrogen, this being an equilibrium mixture that provides an environment of sufficient hydrocarbon pressure so as to neither deposit nor remove carbon in significant quantities, while removing the sulphur present. While this treatment has proven to be commercially acceptable, it has certain disadvantages in maintaining the degree of control necessary for the precise equilibrium required under manufacturing conditions. Manufacturing difficulties may arise in part because of poor metering of the gases, of variations in temperature due to variations in furnace equipment, the introduction of air into the gases and furnaces, or slight changes of the equipment settings by the operators.

An object of this invention, is therefore, to provide an improved method for the removal of sulphur from carbonized metal electrodes with little or no removal of the carbon content thereof. Whether or not there is any disturbance of the carbon coating depends in part on the carbonizing method employed and the resulting tenacity of the carbon on the electrode surface. In employing the method of this invention on electrodes carbonized by various techniques, there was no perceptible removal of carbon in a majority of the samples and extremely minute changes on the other samples.

A further object of this invention is to enable treatment of carbon coated electrodes to expel the sulphur therefrom by a method that is not sensitive to slight variations in any of the various parameters of the method, such as time, temperature, or percentage of the gases employed.

These and other objects are realized in accordance with one aspect of this invention by treating the carbonized electrode in a hydrogen atmosphere, the pressure of the hydrogen gas being reduced by the admixture of a large percentage of an inert gas. It has been discovered that when the carbonized electrode is heat treated in a mixture of pure dry hydrogen and a pure dry inert gas, with which not the hydrogen, carbon, sulphur, nor the metal of the electrode will react, the hydrogen will discriminate between the sulphur and carbon present in the electrode and will remove all of the sulphur present but will not remove any perceptible amount of the carbon present.

More specifically, in accordance with one specific illustrative embodiment of this invention, hydrogen is diluted, with a concomitant reduction in its partial pressure, with nitrogen, the mixture employed being 93 per cent nitrogen and 7 per cent hydrogen. A nickel electrode having a carbon coating thereon is heated in this atmosphere at 1000° C. for a period of fifteen minutes, thereby removing substantially all sulphur and sulphur compounds with little or no alteration in the carbon coating. It is to be appreciated that there may be variations in these values without departing from the scope of this invention or the advantageous results thereof. Further, in accordance with this invention, sufficiently high temperatures may be employed to simultaneously outgas the electrodes without causing the hydrogen and carbon to react to form methane.

It is, therefore, one feature of this invention that the hydrogen be diluted with an inert gas to such a partial pressure that little or no reaction between hydrogen and carbon takes place during a constant flow of the gas mixture by the electrode to remove the sulphur therefrom.

It is a further feature of this invention that a carbon coated metal be heated in a mixture of from 5 to 10 per cent hydrogen and an inert gas to a temperature sufficient to outgas the electrodes and be maintained at that temperature until substanially all the sulphur in the carbon coating has been expelled with little or no alteration of the carbon coating.

These and other features of this method of heat treatment of carbonized nickel plates will be more clearly understood with reference to the following description and the drawing which illustrates diagrammatically one method for processing carbon coated nickel electrodes to remove the sulphur therefrom in accordance with this invention.

Referring now to the drawing, hydrogen, which is shown as being stored in a source such as the gas tank 10, is passed over palladized alumina 11 to convert any oxygen that may be present in the hydrogen into water. The purified hydrogen is then fed into a mixing bottle 12 through a meter 13. Nitrogen, or another inert gas, such, for example, as helium or neon, may similarly be stored in a source, such as the gas tank 14. The nitrogen is fed directly into the mixing bottle 12 through a meter 15. The mixture of the gases is then passed through activated alumina dryers 16 to reduce the dew point to below —45° C. after which the mixture of pure dry gases is fed into the furnace tube 17. In the embodiment of this invention illustrated, a mixture of 7 per cent hydrogen and 93 per cent nitrogen is employed though the partial pressure of the hydrogen may be reduced sufficiently by other percentages, as explained more fully below.

The furnace tube 17 is first flushed out with the mixture of gases before the carbonized nickel plates, not shown, are introduced into it. The plates are then introduced, as in a bright nickel boat, and positioned in the heating zone of the furnace where they are, in accordance with the specific embodiment illustrated, heated at 1000° C. for fifteen minutes. They are then removed to the cooling zone of the furnace tube 17 where they are cooled to approximately room temperature, after which they are withdrawn from the furnace. The boat in which the plates are contained may be placed on a chain or conveyer to automatically proceed from the heating to cooling zones of the furnace.

The heating advantageously takes place at atmospheric pressure, the mixture of hydrogen at a reduced partial pressure and the inert gas being introduced into the furnace at the rate of approximately 5 liters per minute. As the furnace employed in this embodiment had a constant cross section of a 2-inch diameter and a 3.14 square inch area, the gas mixture may advantageously be introduced into the furnace at a per unit flow rate of 1.05 liters per minute per square inch of cross-sectional area. The desulphurizing gases flow through the furnace tube constantly and sweep up the reaction product of the combination of the hydrogen with the various sulphur compounds that may be present in the nickel and in the carbon coating as well as gases being expelled from the coating by virtue of the heat employed. The nitrogen, hydrogen, and hydrogen sulphide are then advantageously exhausted directly into the air.

The furnace tube 17 may advantageously be of the type described in the above-mentioned Brown-Wooten patent, though others known in the heat treatment art may be employed.

The invention is, of course, not limited to the one illustrative embodiment discussed above with reference to the drawing. The various parameters of this method may be varied within limits that will still allow a sufficient reduction in the partial pressure of the hydrogen in conjunction with the constant flow of the gas mixture to affect the comparative speeds of the hydrogen sulphide and methane reactions to such a point that substantially all the sulphur and sulphur compounds are removed before there is a discernible formation of methane by the removal of any carbon. Thus, it has been found that the percentage of hydrogen may advantageously be varied from approximately 5 to 10 per cent. Thus, if a mixture of 7 or 8 per cent hydrogen is to be employed, it is obvious that slight inaccuracies in meters, settings, or equipment would not impede the process as the percentages, which determine the required partial pressure, while critical are not sensitive within these critical limits.

Similarly, the exact length of time the process is carried out need only be determined by the condition that all the sulphur be expelled and that following its complete expulsion, the treatment not be continued a sufficient length of time to allow the formation of methane. If desired, the time for removal of the carbonized nickel plates from the heating zone of the furnace may be determined by sulphur sensitive materials in contact with the exhaust gases, the plates being shifted when the sensitive materials show an absence of sulphur or hydrogen sulphide in the exhaust gases. In accordance with out discovery, at that time substantially all the sulphur has been removed, and we have usually been unable to determine, by measurements of the weight of the coating before and after the expulsion of the sulphur, any loss of carbon by the coating or, at worst, only very minute losses, depending on the carbonizing technique employed. This result occurs in this process in accordance with our invention even though the carbon is a coating on the nickel surface, thereby presenting a very large exposed area to the hydrogen molecules adjacent to it.

Thus, we have determined that all the sulphur may be removed by a heat treatment in accordance with our invention for a period as short as ten minutes but that perceptible loss of carbon will not occur if the heat treatment is carried on for as long as approximately 30 minutes. We have also determined that the process may be carried out at temperatures varying from approximately 900 to 1100° C., the temperature thus being above that at which the electron discharge device in which the electrode is incorporated will operate. The temperature is also sufficiently high to simultaneously outgas the electrode, thereby reducing the number of heat treatments required. In the use of this process, it is advantageous that both the time and temperature be towards the lower end of the advantageous ranges so that the equipment employed may be used most efficiently.

Carbonized nickel electrodes treated in accordance with our invention, wherein the hydrogen partial pressure is reduced and the constant flow of the gas mixture flushes the reaction products out of the furnace, and wherein the formation of hydrogen sulphide proceeds while the formation of methane is substantially entirely inhibited, have been found to have had substantially all sulphur removed without the apparent removal of any carbon in most instances. Such electrodes may therefore be directly incorporated into electron discharge devices without the subsequent evolution of sulphur to poison the emitting oxides and without there being either an insufficient carbon coating or the breaking away in the device of carbon dust.

While one specific embodiment has been described, it is to be understood that it is merely illustrative of the principles of this invention. Various details may be modified and altered by those skilled in the art without departing from the scope and spirit of this invention.

1. The method of desulphurizing a carbon coated electrode having a nickel surface which comprises placing the electrode in a furnace, flowing a gas mixture through said furnace, said gas mixture consisting of from 5 to 10 per cent hydrogen and the remainder a gas inert to combining with carbon and sulphur, heating said furnace to a temperature of the order of 1000° C. until substantially all the sulphur in the carbon coating has been expelled and discontinuing the heating before the removal of any significant amount of carbon from the coating.

2. The method of desulphurizing a carbon coated electrode which comprises introducing the electrode to the heating zone of a furnace, flowing a mixture of from 5 to 10 per cent hydrogen and the remainder an inert gas through the furnace, said gas being inert to forming compounds with carbon and sulphur, heating said electrode to a temperature in the order of 1000° C. for a period of from ten to thirty minutes to completely remove the sulphur present as contaminants in the coating with little or no altering of the amount of carbon in the coating, moving said electrode to the cooling zone of said furnace, and removing said electrode from said cooling zone when reduced to room temperature.

3. The method of desulphurizing a nickel electrode having a carbon coating thereon which comprises introducing the electrode into a furnace, flowing a mixture of from 5 to 10 per cent hydrogen and the remainder nitrogen through said furnace, heating said electrode at a temperature of from 900 to 1100° C. until substantially all the sulphur has been expelled from the carbon coating and discontinuing the heating of said electrode before any significant amount of the carbon is removed.

4. The method of desulphurizing a nickel electrode having a carbon coating thereon which comprises introducing the electrode into a furnace, flowing a mixture of approximately 7 per cent hydrogen and the remainder an inert gas through said furnace, said gas being inert to the formation of compounds with carbon and sulphur, and heating said electrode to a temperature of the order of 1000° C. for a period of from ten to thirty minutes to selectively reduce substantially all the sulphur present in said coating without any significant reduction of the carbon in said coating.

5. The method of desulphurizing a nickel electrode having a carbon coating thereon which comprises introducing the electrode to the heating zone of a furnace, flowing a mixture of 7 per cent hydrogen and 93 per cent nitrogen through said furnace at the rate of approximately 1.06 liters per minute per square inch of cross-sectional area at atmospheric pressure, heating said electrode to approximately 1000° C. for approximately fifteen minutes to selectively cause reaction between all the sulphurous compounds and sulphur present in the coating without significantly affecting any of the carbon in the coating, continually exhausting the evolved reaction gases, moving said electrode to the cooling zone of said furnace in said mixture, and removing said electrode from said furnace when reduced to room temperature.

6. The method of desulphurizing a carbon coated electrode which comprises placing the electrode in a furnace, flowing a gas mixture through said furnace, said gas mixture consisting of from 5 to 10 per cent hydrogen and the remainder a gas inert to carbon and sulphur, and heating said furnace to a temperature of the order of 1000° C. to completely remove the sulphur present in the carbon coating as contaminants with substantially no altering of the amount of carbon in the coating.

EDWARD J. BECKER.
FRANK J. BIONDI.

References Cited in the file of this patent

UNITED STATES PATENTS

| Number | Name | Date |
|---|---|---|
| 1,842,200 | Ramage | Jan. 19, 1932 |
| 1,851,573 | Elsey | Mar. 29, 1932 |
| 1,880,937 | Elsey | Oct. 4, 1932 |
| 1,908,759 | Iredell | May 16, 1933 |
| 2,314,816 | Brown, Jr., et al. | Mar. 23, 1943 |

OTHER REFERENCES

Jenkins: Controlled Atmospheres for the Heat Treatment of Metals. Published by Chapman & Hall Ltd., London, 1946, page 285.